(12) United States Patent
Hendrix et al.

(10) Patent No.: US 6,624,914 B1
(45) Date of Patent: Sep. 23, 2003

(54) MULTIPLE RESOLUTION SELECTABLE LENS SCANNING SYSTEM AND METHOD

(75) Inventors: Steven W. Hendrix, Jamul, CA (US); Stephen B. Witte, Poway, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 09/522,967

(22) Filed: Mar. 10, 2000

(51) Int. Cl.$^7$ ................................................ H04N 1/04
(52) U.S. Cl. ........................ 358/484; 358/475; 358/474; 358/497
(58) Field of Search ................................ 358/486, 474, 358/475, 484, 471, 497, 506, 509, 487; 359/821; 399/199, 211; 355/55; 250/234–236

(56) References Cited

U.S. PATENT DOCUMENTS

| | | | |
|---|---|---|---|
| 3,476,478 A | 11/1969 | Rees, Jr. ........................ 355/55 |
| 3,542,467 A | 11/1970 | Ferguson et al. ............. 399/201 |
| 3,832,057 A | 8/1974 | Shogren ........................ 399/212 |
| 3,884,574 A | 5/1975 | Doi et al. ...................... 355/66 |
| 4,118,118 A | 10/1978 | Barto, Jr. ..................... 399/199 |
| 5,497,272 A | 3/1996 | Wun ............................ 359/821 |
| 5,552,939 A | 9/1996 | Tseng et al. ................. 359/821 |
| 5,883,727 A | 3/1999 | Tsai ............................ 358/475 |
| 6,424,433 B1 * | 7/2002 | Miyauchi et al. ............ 358/471 |

OTHER PUBLICATIONS

UK Patent Office Search Report dated Aug. 2, 2001, Application No. GB 0104156.5.

* cited by examiner

Primary Examiner—Cheukfan Lee

(57) ABSTRACT

A scanner system and method are described, wherein two lenses are mounted on a slider positioned in the optical light path between two moving mirrors and the optical sensor. Each mirror is mounted on a moving carriage. The slider is bistable in two alignment positions, one for each lens. The slider is moved by the motion of one of the carriages. As the carriage moves toward the lens slider, a linkage causes the slider to move from the position it is currently in to the other position. This system allows the slider to be shuttled from one position to the other, thereby changing resolutions, using energy provided by the same motor that moves the mirrors.

19 Claims, 8 Drawing Sheets

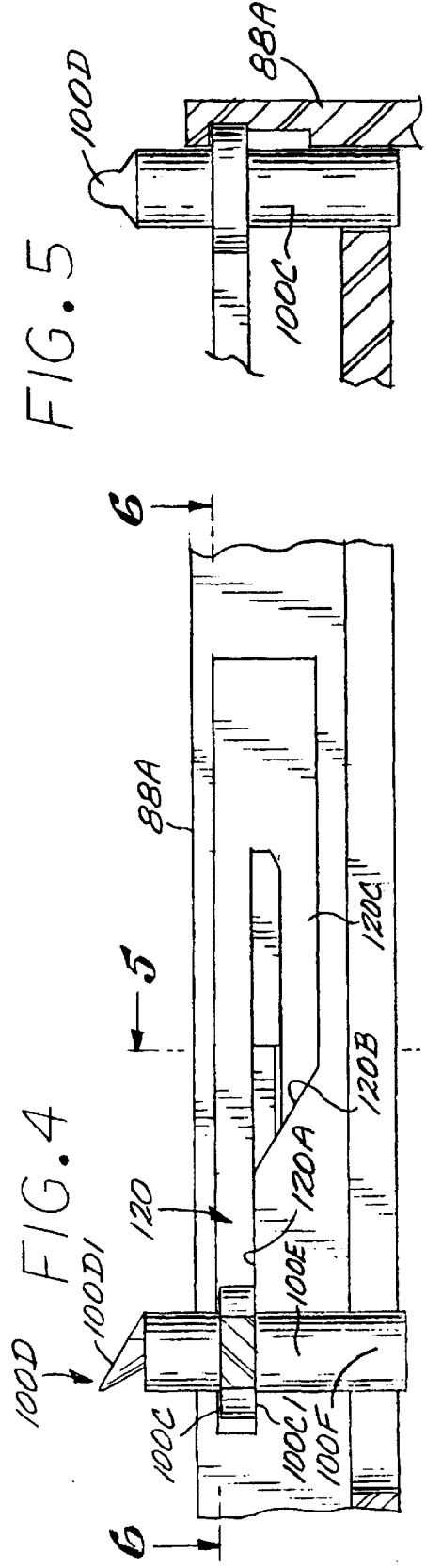
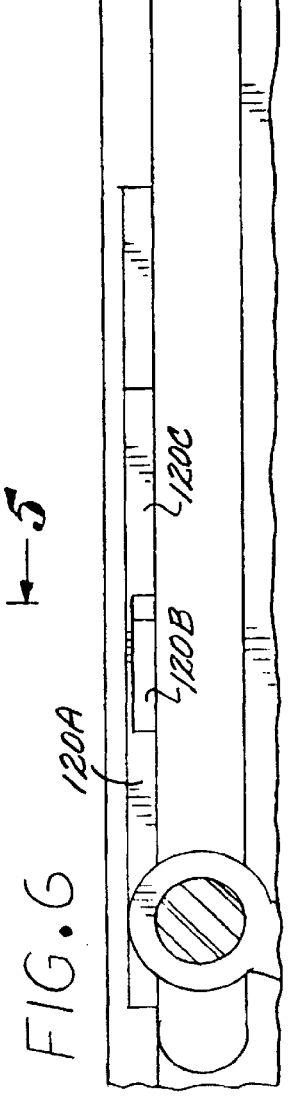
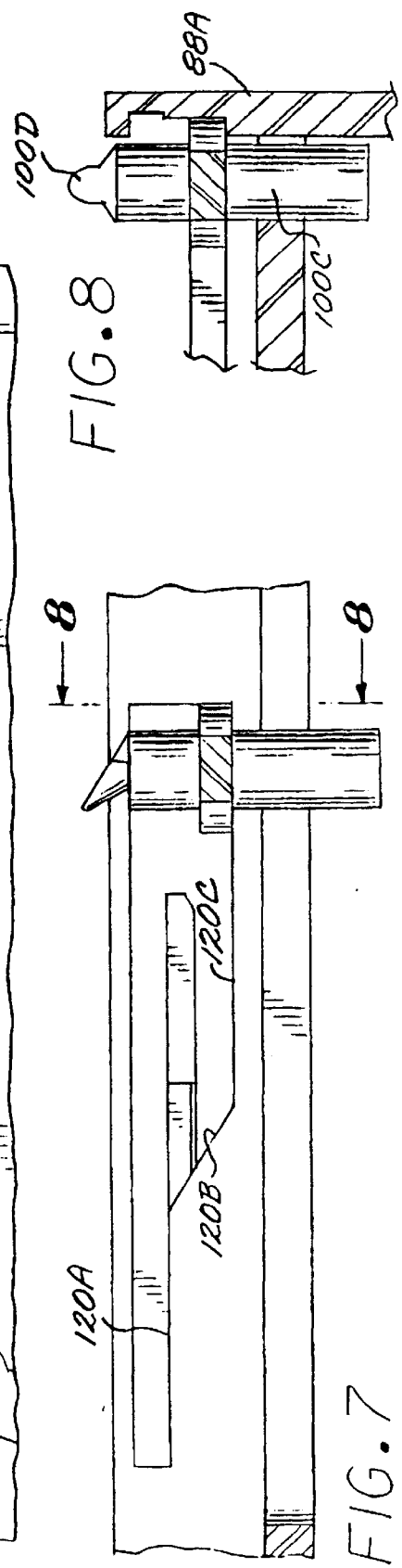
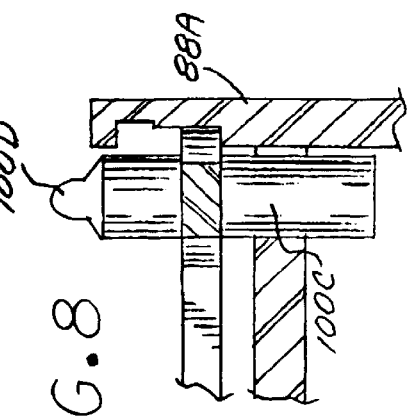

MULTIPLE RESOLUTION SELECTABLE LENS SCANNING SYSTEM AND METHOD

TECHNICAL FIELD OF THE INVENTION

This invention relates to optical scanning systems, and more particularly to techniques for providing multiple resolutions.

BACKGROUND OF THE INVENTION

Moving mirror scanning systems are known, wherein two mirrors are moved relative to a target to be scanned to direct a reflected beam to a sensor. It would be advantageous to provide a technique for changing the resolution of the system without requiring a separate motor for changing lenses.

SUMMARY OF THE INVENTION

In accordance with an aspect of the invention, a scanner system is described, wherein two lenses are mounted on a slider positioned in the optical light path between two moving mirrors and the optical sensor. Each mirror is mounted on a moving carriage. The slider is bistable in two alignment positions, one for each lens. The slider is moved by the motion of one of the carriages. As the carriage moves toward the lens slider, a linkage causes the slider to move from the position it is currently in to the other position. This system allows the slider to be shuttled from one position to the other, thereby changing resolutions, using energy provided by the same motor that moves the mirrors.

In accordance with another aspect, methods are described for changing imaging resolution in an optical scanning system having a fixed optical sensor, and a moving carriage. An exemplary method includes:

moving the carriage to a position outside a normal scanning area;

engaging a slider linkage coupled to a slider structure which is movable between a plurality of home positions, the slider structure having mounted thereon a plurality of lenses of different optical power, wherein each said home position positions a corresponding one of said lenses in an optical scanning path for the system;

moving the slider structure to a home position by a driving force provided by motion of the carriage and the slider linkage; and disengaging the carriage from the slider linkage.

BRIEF DESCRIPTION OF THE DRAWING

These and other features and advantages of the present invention will become more apparent from the following detailed description of an exemplary embodiment thereof, as illustrated in the accompanying drawings, in which:

FIG. 4 is a partial view of the slider linkage taken in the direction of line 4—4 of FIG. 1.

FIG. 5 is a cross-sectional view taken along line 5—5 of FIG. 4.

FIG. 6 is a cross-sectional view taken along line 6—6 of FIG. 4.

FIG. 7 is a view similar to FIG. 4, but showing the rod at the opposite end of its range of motion.

FIG. 8 is a cross-sectional view taken along line 8—8 of FIG. 7.

DETAILED DESCRIPTION OF THE PREFERRED EMBODIMENT

Figure 1:
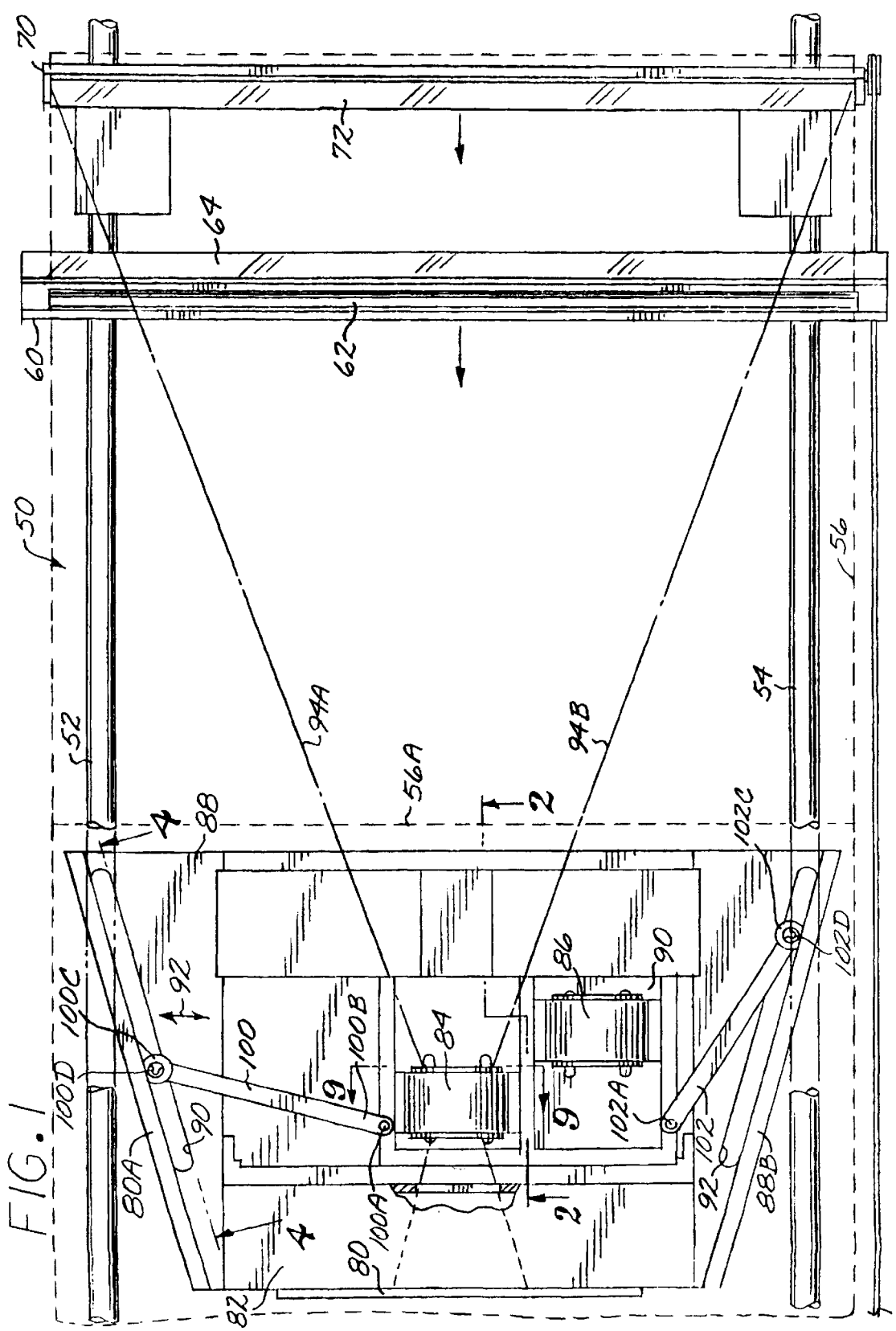
FIG. 1 is a diagrammatic top view of an exemplary embodiment of a scanner system in accordance with the invention.

An exemplary embodiment of a dual resolution scanning system 50 in accordance with the invention is illustrated in FIG. 1. This diagrammatic top view does not show the glass platen situated above the scanner elements shown to support the target to be scanned. The system includes a pair of spaced carriage slider rods 52, 54 which are mounted to a frame structure (not shown). These rods support a scan carriage 60 and a mirror carriage 70 for sliding movement along the rods, to traverse the scan image area 56. The scan carriage 60 carries an elongated light source 62, such as an array of LEDs, cold cathode fluorescent (CCFL) tube or a Xenon tube. In an exemplary embodiment, the light source is a CCFL tube 9 inches long and 3 mm in diameter. The light source is energized during scanning operations to illuminate the target with light, and illumination light reflected from the target is reflected onto mirror 64 also carried by the carriage 60 toward a mirror system 72 carried by the reflector carriage 70. The reflected light is in turn redirected by the mirror system 72 toward an optical sensor 80 mounted on a stationary housing 82, through a lens. In an exemplary embodiment, the sensor is a linear CCD array of light sensitive elements or pixels. The lens focusses the light on the sensor elements.

Figure 15:
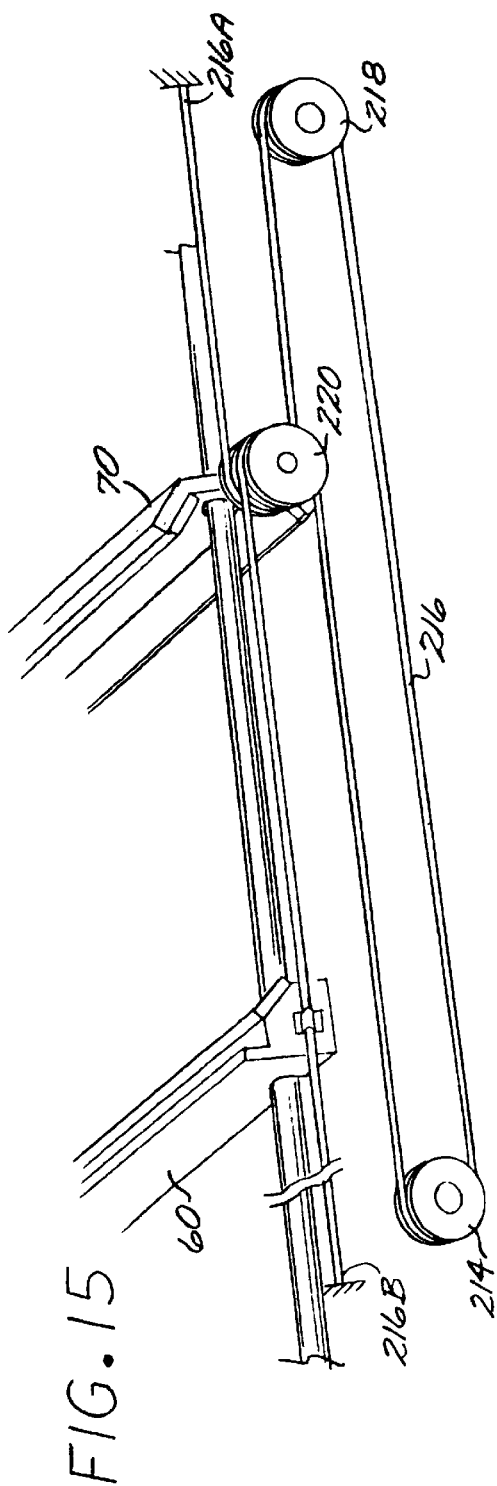
FIG. 15 is a diagrammatic view illustrating an exemplary cabling drive arrangement for the scanning system of FIG. 1.

The two carriages 60 and 70 are moved by a cable/pulley/motor drive system 210 (FIG. 16) which is known in the art. The drive system typically moves the scan carriage at twice the rate of the reflector carriage. An exemplary cabling arrangement is shown in FIG. 15, wherein cable 216 has its ends 216A, 216B fixed as generally illustrated. The cable is reeved about pulleys 214, 218, 220, and fixed to the scan carriage 60. Pulleys 214 and 218 are mounted at fixed locations relative to the scanner frame. Pulley 220 is a double pulley mounted on the reflector carriage 70 for rotation. This type of cabling system results in the scan carriage being driven at twice the rate of the reflector carriage.

To the extent just described, the scanner system 50 is conventional. In accordance with an aspect of the invention, the system is provided with a multiple lens system to provide multiple scan resolution. The lens system is actuated by the motion of a carriage. As a result, a separate lens drive system with its own motor is not needed.

Figure 13:
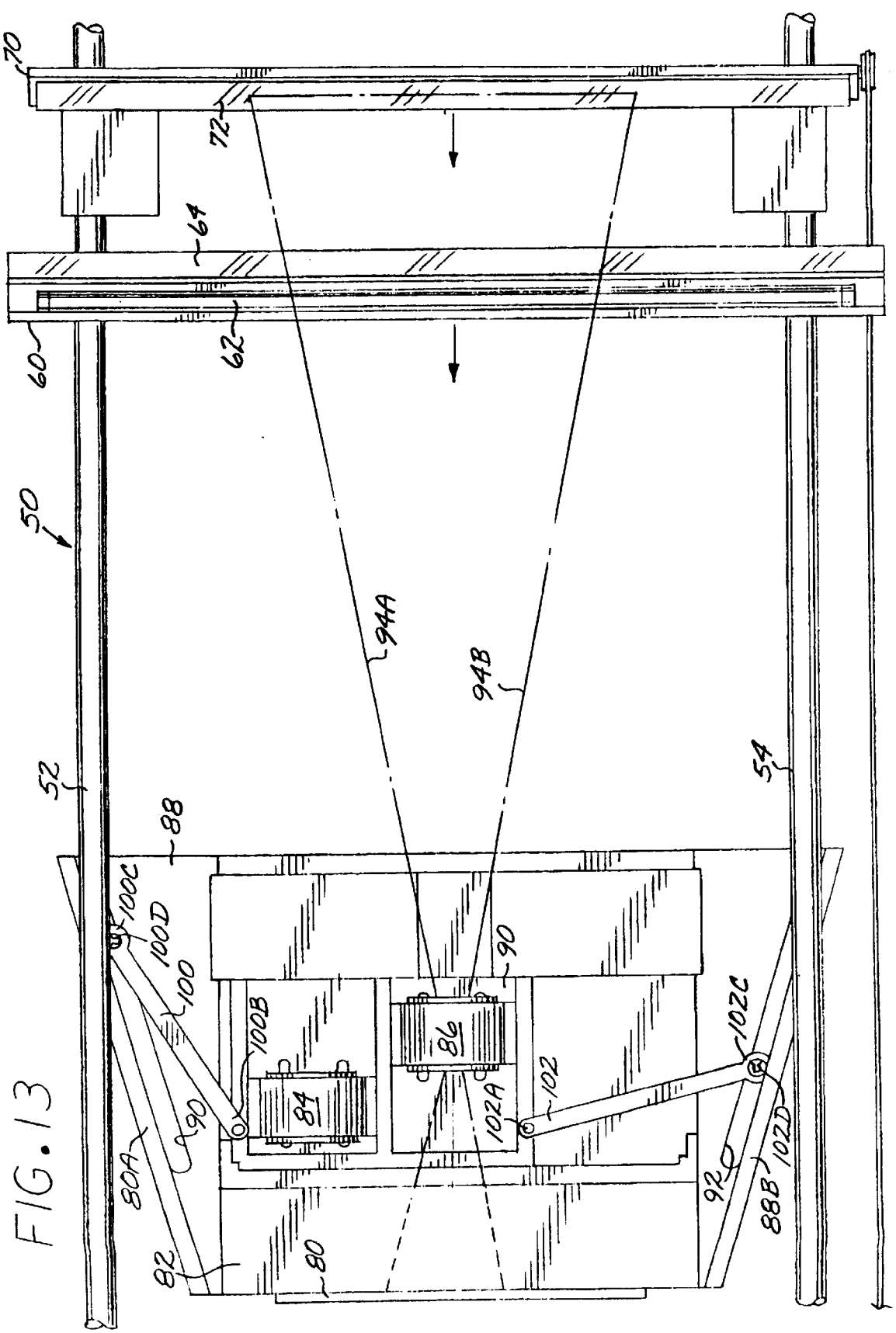
FIG. 13 is a top view of the scanning system of FIG. 1 showing a high resolution lens field of view.

The sensor housing 82 is mounted on a bracket structure 88. The structure 88 has formed therein slots 90 and 92 positioned at respective acute angles with respect to the carriage rods 52, 54. Also mounted on the bracket 88 is a slider structure 90. The slider structure has mounted thereon the two lenses 84, 86 and is slidable along axis 92 in a direction transverse to the orientation of the rods between two home positions. One home position is shown in FIG. 1, and is the position orienting lens 84 in the optical path between the target and the sensor 80. This lens 84 is the low resolution lens, and will scan the full width of the target page and image it onto the full width of the sensor array. The second home position is shown in FIG. 13, and is the position orienting lens 86 in the optical path between the target and the sensor. The lens 86 is the high resolution lens and will scan a portion of the width of the target page and image it onto the full width of the sensor 80. The smaller the portion of the target width scanned, the higher the resolution. If half the target width is scanned, the resolution will be double the normal resolution.

An exemplary embodiment of the sensor 80 is a 5300 pixel CCD array, which can provide 600 pixel per inch (PPI) scan resolution when used with a lens 84 having an optical power for providing a full target (page) width image onto the sensor. The lens 86 images less than the full page width onto the CCD array, and this provides a higher resolution scan over an area the full length of the target page but only partial width. For example, if one quarter of the width of the page is imaged by the lens 86, the resolution for a 5300 pixel CCD sensor would be 2400 PPI.

To change the resolution, a pushrod linkage coupled to the slider structure 90 is actuated by the reflector carriage. The linkage includes two pushrods 100, 102, respectively pivotally connected to opposite lateral edges of the slider structure 90. A pin 100A is passed through an opening in the slider end 100B of the pushrod 100 to pivotally mount the slider end of the pushrod 100 to the slider structure. A pin 102A is passed through an opening in the slider end 102B of the pushrod 102 to pivotally mount the slider end of the pushrod 102 to the slider structure. The distal ends 100C, 102C of the pushrods have hooks 100D, 102D extending upwardly for engagement with corresponding hooks carried by the reflector carriage. Only one of the pushrods will be positioned with its hook in position for engagement by the scanning carriage hook.

Figure 2:
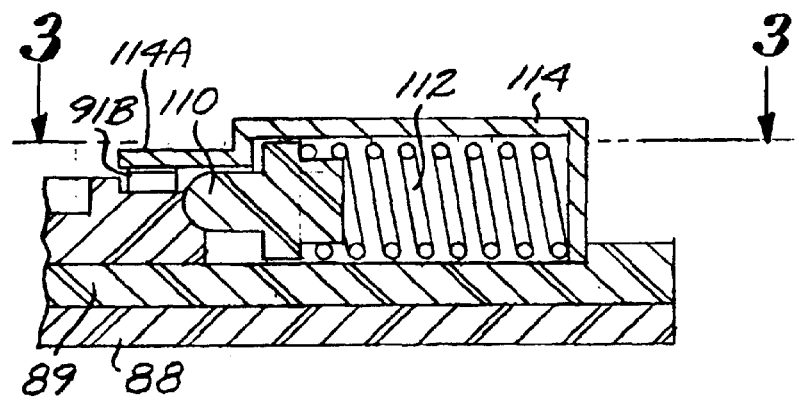
FIG. 2 is a cross-sectional view taken along line 2—2 of FIG. 1.
Figure 3:
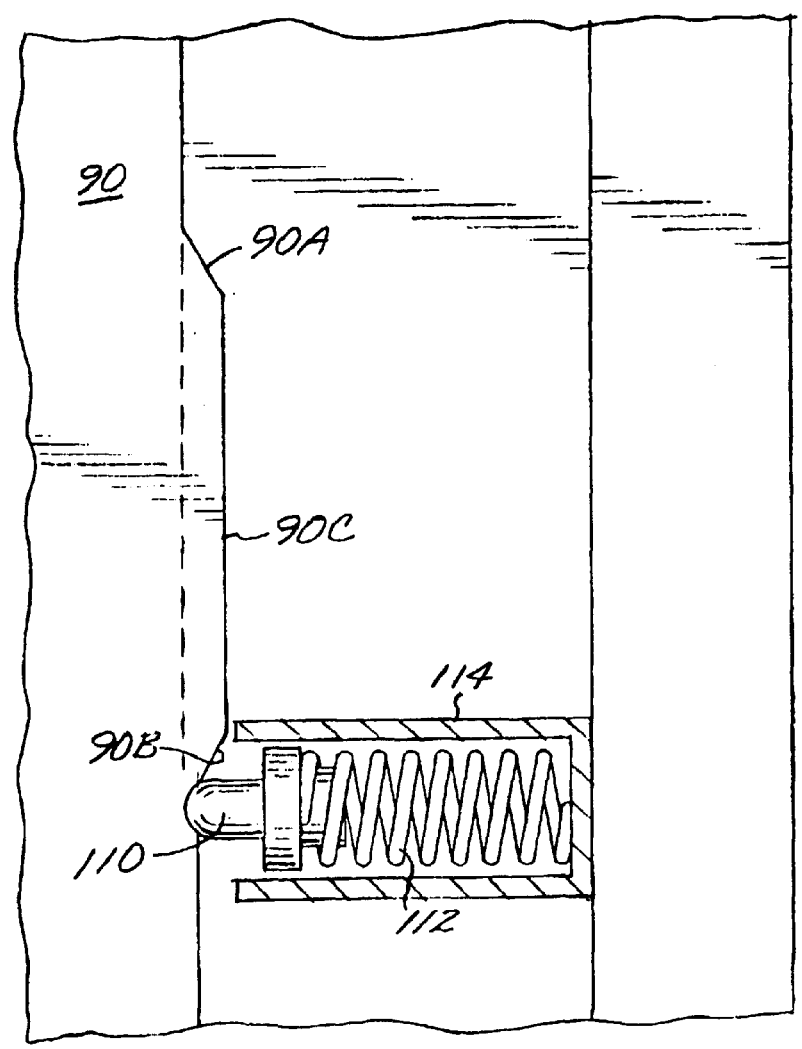
FIG. 3 is a broken-away view illustrating the spring-detent feature of the lens slider.
Figure 9:
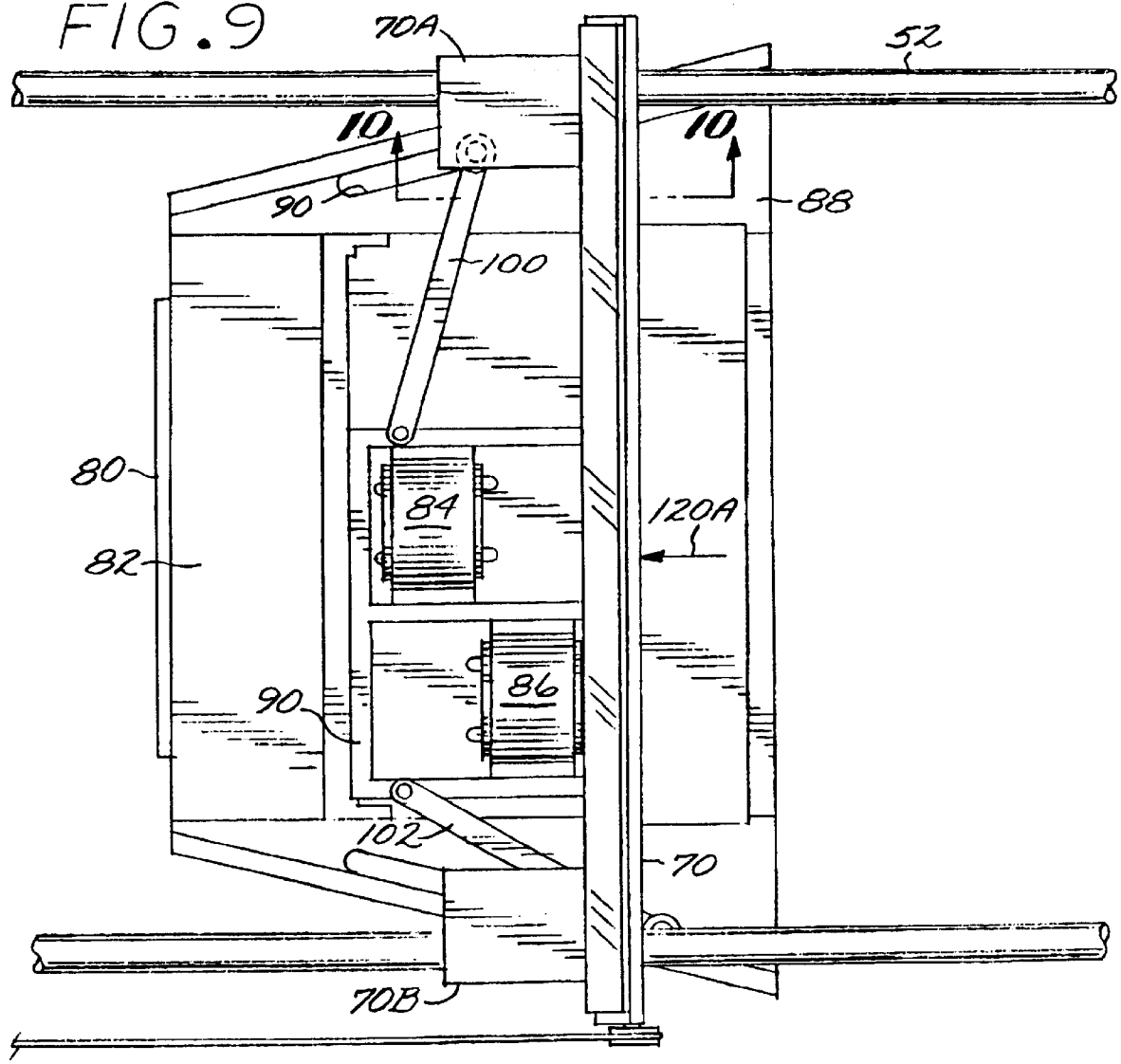
FIG. 9 is a partial top view of the scanning system of FIG. 1, showing the reflector carriage at the commencement of an actuating cycle.
Figure 10:
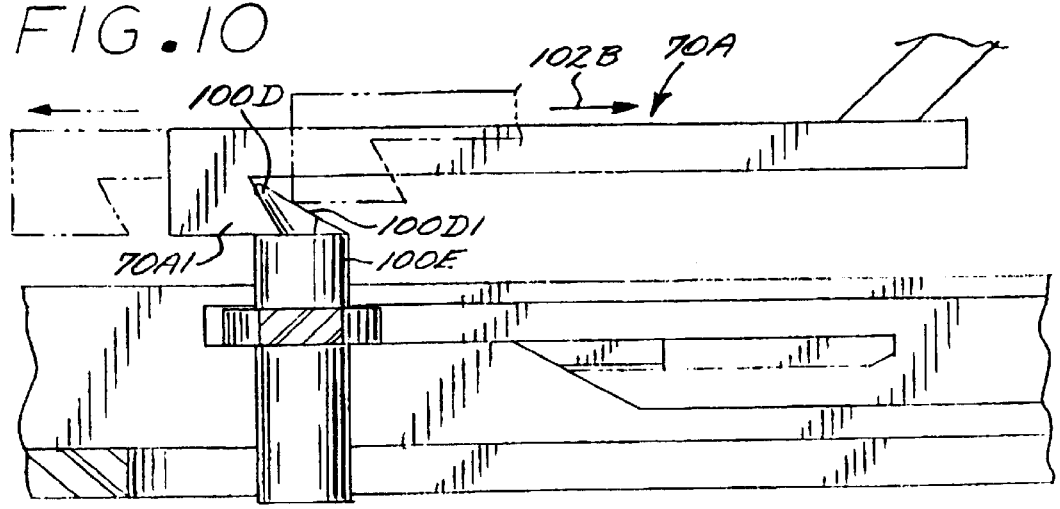
FIG. 10 is a cross-sectional view taken along line 10—10 of FIG. 9.
Figure 11:
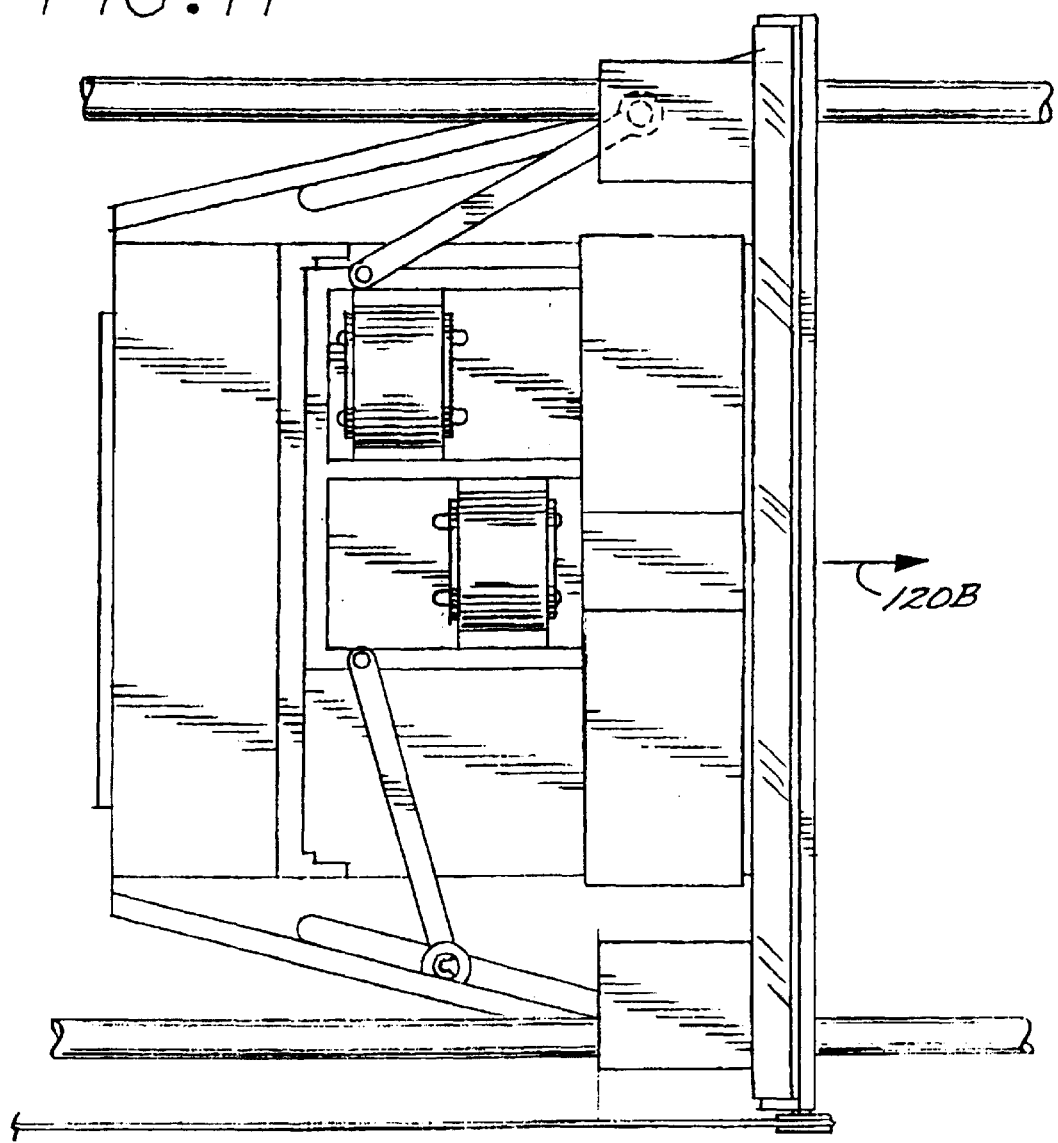
FIG. 11 is a top view similar to FIG. 9, showing the reflector carriage near the end of an actuating cycle.
Figure 12:
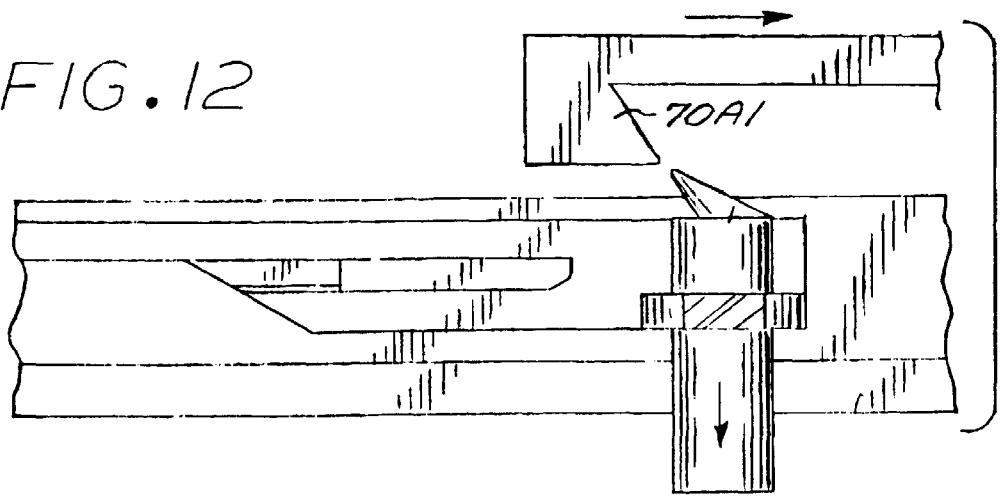
FIG. 12 is a cross-sectional view similar to FIG. 10, but showing the pushrod in the lower position, out of engagement with the carriage hook.
Figure 14:
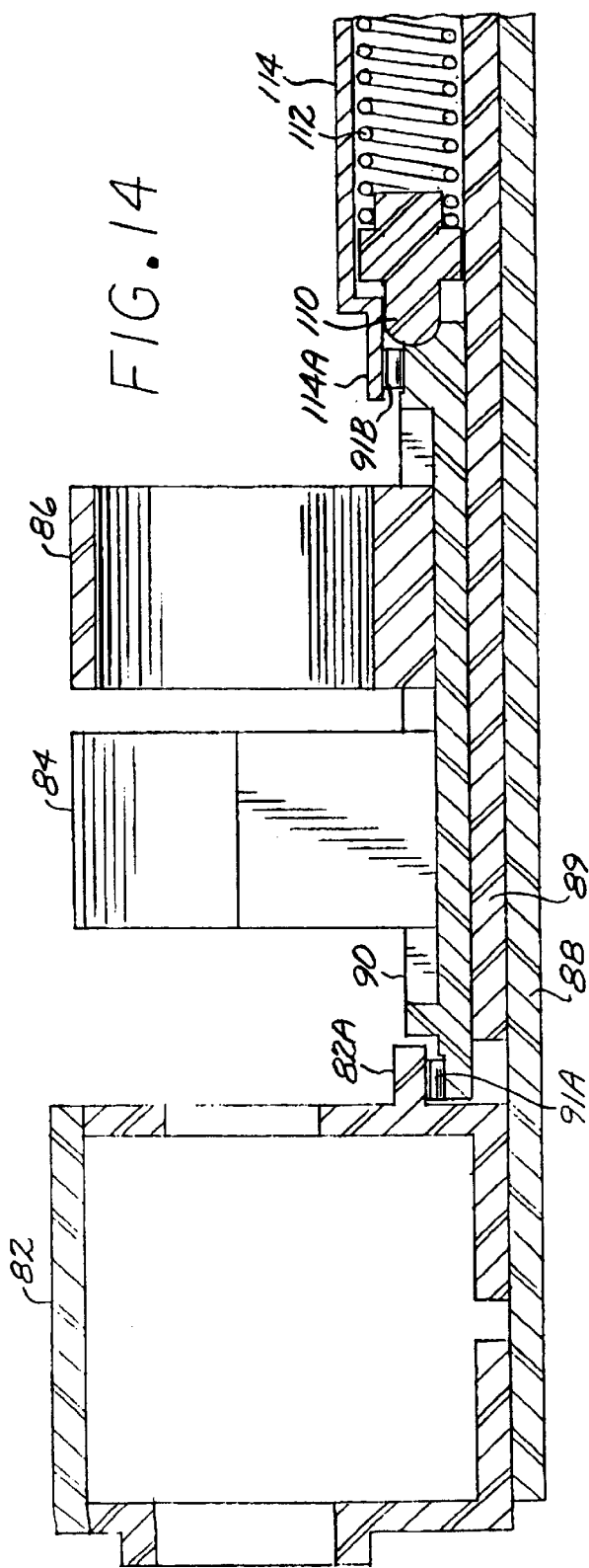
FIG. 14 is a cross-sectional view illustrating the slider structure mounted on the bracket structure of the scanning system of FIG. 1.

A detent mechanism is employed to force the slider structure to move to a home position as it is pushed by a pushrod to approach the home position. There are two home positions, one for the low resolution lens and the other for the high resolution lens. FIGS. 2, 3 and 14 illustrate the detent mechanism. The slider structure 90 is positioned for sliding movement on a planar surface of top structure 89 attached to the bracket 88. The slider structure includes a protruding beveled surface with a first ramp 90A, a second ramp 90B and a flat surface 90C between the ramps. Mounted to the structure 89 is a spring-loaded plunger 110. The plunger and a spring 112 are captured in a cylindrical opening in boss 114 mounted to top structure 89, so that the spring biases the plunger to an extended position, but allows the plunger to be retracted within the boss under force. The plunger tip rides along the surfaces of the slider structure, so that as the slider structure is moved by a pushrod, the plunger tip will ride up a ramp to the flat surface 90C, storing energy in the spring. As the slider structure is pushed further by the pushrod to the opposite ramp, the energy stored in the spring will ensure that the slider will move all the way to the home position even if no more pushing force is applied by the pushrod. This spring energy will cause the active pushrod to move ahead of the reflector carriage and drop down into its guide, as will be described below.

The slider structure 90 is held against the top structure 89 by leaf springs 91A, 91B, which are captured between surfaces of the slider structure 88 and top lips 82A, 114A (FIG. 14). The leaf springs provide bias forces to insure that the slider 90 remains in aligned position relative to the slide axis.

Each pushrod hook member is formed on a rod which extends into the corresponding slot 90, 92 formed in the bracket structure. An exemplary hook member rod is shown in FIGS. 4–8. Here, the hook 100D is formed on one end of rod 100E which is fitted transversely into an eye opening formed at the end of the pushrod 100. The hook has a ramp surface 100D1. The opposite end 100F of the rod travels in the slot 90, constraining the movement of the distal end 100C of the pushrod to follow the contour of the slot.

The distal end 100C of the pushrod includes an end shoulder surface 100C1 which rides on a cam surface 120 defined in the wall 88A of the bracket structure along the slot. The surface 120 has an elevated portion 120A, a ramp portion 120B and a lower portion 120C. FIG. 4 illustrates the pushrod 100 in a back, elevated position, wherein the tip of the pushrod is in contact with the elevated portion 120A of the cam surface, and the hook 100A is positioned for engagement by the reflector carriage hook, if the carriage is moved to the engagement position.

FIG. 7 is a view similar to FIG. 4, but showing the pushrod in a forward position, wherein the pushrod tip is in contact with the lower cam surface 120C. In this position, the pushrod tip is lowered such that the hook 100D is beneath the level of the carriage hook, and so the carriage hook will not engage the pushrod hook. The two elevations of the pushrod hook are also shown in FIGS. 5 and 8.

FIGS. 9–12 show the operation to switch from the low resolution lens 84 to the high resolution lens 86. With the slider structure 90 in its home position for low resolution scanning, the lens 84 is in the optical path of the reflected light energy. With the slider structure in this home position, the pushrod 100 is positioned in a rearward position, with its hook 100C in the raised. position illustrated in FIG. 4. To move the slider structure 90, the reflector carriage 70 is moved in a rearward direction, in the direction of arrow 120A (FIG. 9), to an area outside a reflector carriage scan mode range of travel. A boundary 56A of this range of travel is indicated in FIG. 1. The carriage 70 has mounted on each end a hook structure 70A, 70B. As the carriage is moved in the rearward direction to an actuating position, the hook 70A1 on the carriage contacts the ramp surface 100D1 on the hook 100D of pushrod 100 and rides over the hook 100D.

To permit the carriage-mounted hooks to ride over the rod-mounted hooks, the hook structures 70A, 70B can be made of a flexible material which has sufficient resilience to permit the upward movement needed, or can include a flexible link portion. Alternatively, the carriage 70 could be mounted to the slider rods on bushings which are open at the bottom side adjacent the pushrod hooks, and which allow the carriage to move upwardly so that the carriage hooks 70A, 70B ride over the tops of the pushrod hooks.

Now the carriage 70 is driven in the forward direction 120B, bringing the hook 70A1 into engagement with the hook 100D on the pushrod. As the carriage 70 is driven forward, the pushrod 100 is pulled forward. Due to the angle of the channel 90 relative to the rod and the hinge action by which the pushrod is coupled to the slider structure, the pushrod exerts a force component transverse to the rod 52, pulling the slider structure toward the rod 52 as the carriage 70 is moved forward. This causes the plunger 110 to engage the ramp surface 90B on the slider structure, compressing the spring 112. As the slider structure moves from one home position toward the other home position, the plunger rides on the flat surface 90C. As the slider structure 90 reaches its detent position for the high resolution lens, the plunger travels down the ramp 90A, releasing the stored energy. This release of energy causes the slider structure to move quickly to its home position, even if the carriage 70 stops moving. The pushrod 100 travels more quickly than the carriage 70, and its distal end travels to the lower position shown in FIG. 12, out of engagement with the hook 70A1 on the carriage 70. Now as the carriage 70 moves further in the direction 120B, the hook 70A1 will pass over the hook 100D without touching it.

To ensure disengagement of the carriage hook 70A1 from hook 100D, the carriage movement can optionally be slowed as the distal end of the pushrod reaches its lower position, or the carriage can be stopped and moved in the reverse direction. Another alternative is to provide feedback on the motor drive and carriage movement to detect as an error condition any failure of a carriage hook to disengage from a pushrod hook.

As the pushrod 100 is being pulled by the carriage, moving the slider structure laterally, the pushrod 102 is being pulled by the slider structure. The distal end of the pushrod 102 travels along the lower channel portion of its guide slot, up the ramp portion to the elevated channel surface. Now the hook 102D is in position to engage the hook structure 70B the next time the carriage is moved backwards to actuate the slider structure. It can thus be seen that the slider structure will be toggled from one home position to the other by the linkage provided by the pushrods and the carriage hooks. Moreover, this toggling occurs without the need for a separate motor drive system to move the slider structure.

Figure 16:
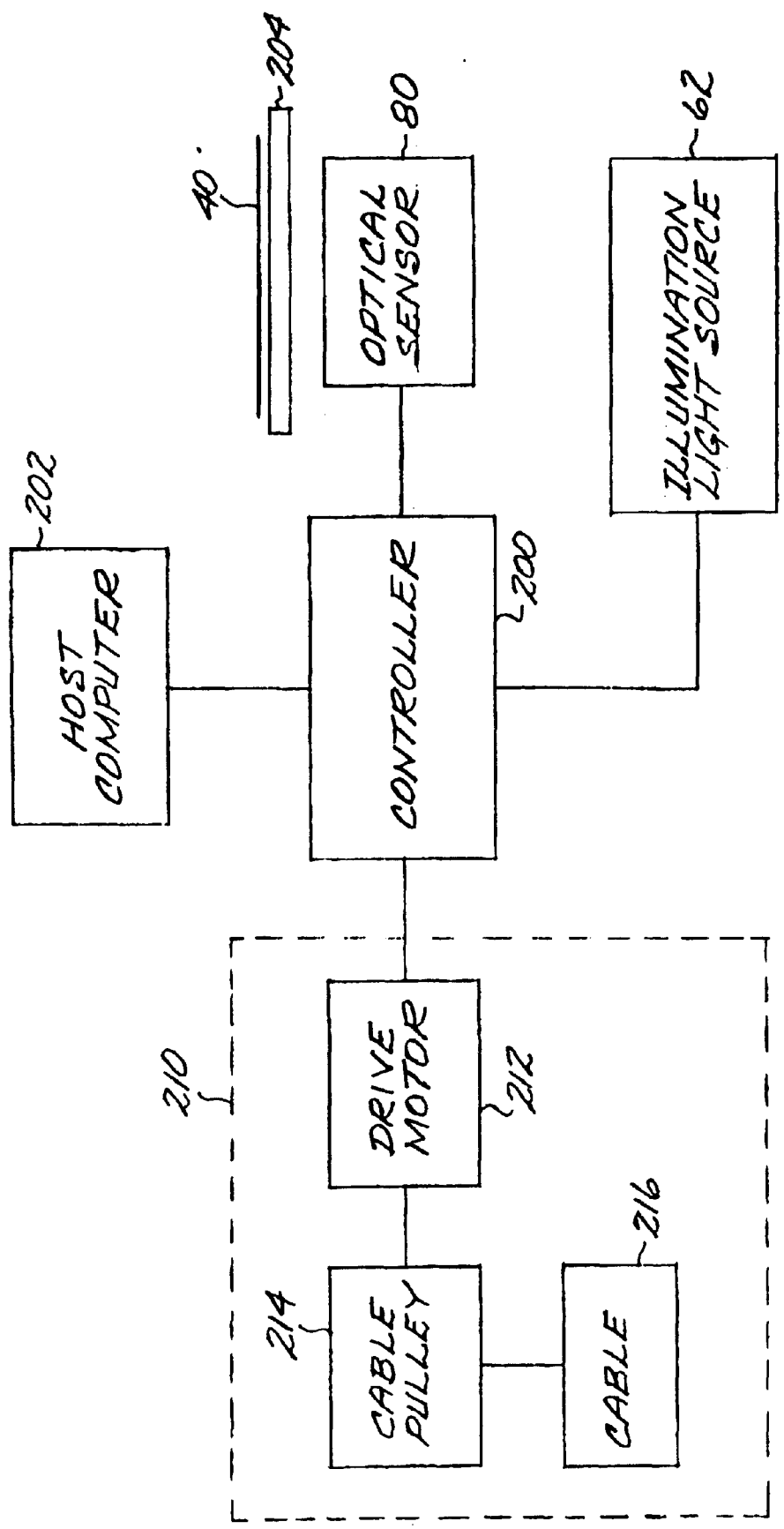
FIG. 16 is a schematic block diagram of an exemplary control system for the scanning system of FIG. 1.

FIG. 16 is a simplified control block diagram for the scanning system 500. Here the target page 40 to be scanned is positioned on the glass platen 204 at the scan region. The system includes an electronic controller 200 such as a microprocessor or ASIC, which controls the drive motor 212 and the illumination light source 62, and receives the scanner optical sensor signals from optical sensor 80. A host computer 202 is connected to the controller, and can optionally receive the representation of the scanned target for its use. The scanner system 50 may be part of a system such as a copy system.

This invention allows two different lenses to be used in a simple scanner system. Selection from one lens to the other is accomplished by the motion of the reflector carriage. This allows a multiple magnification system without having to add an additional motor to switch the lenses.

The described embodiment of the invention is implemented so that pulling the pushrod forward switches the lens slider. This implementation has the advantage of allowing much of the reflector carriage travel used for switching to also be used for normal scanning. The lenses do not move until the mirror carriage hooks the pushrod and starts forward. At the end of actuation the forward pushrod drops down in the guide track so that the scanner is now free to move back and forth over this pushrod without actuating the lens system. The only travel that can not be used for scanning is that required to hook over the pushrod. This would probably be about ¼ inch in an exemplary implementation.

The invention can be implemented in other ways. For example, an alternate embodiment of the system switches the lens by pushing with the carriage so that actuation occurs as the reflector carriage 70 moves towards the lens 84, 86. To do this the guide tracks in which the distal ends of the pushrods run are rearranged so that the pushrod nearest the lens is up and the other down. The ramp profiles on the mirror and pushrods are reversed from that illustrated in FIG. 4 so that the hook on the reflector carriage engages the pushrod hook as it moves towards the lens. As the mirror carriage moves backwards, i.e. toward the lens slider structure (direction arrow 120A) it pushes the pushrod backwards. The other pushrod passes under the reflector carriage and follows the channel upward at the end of its travel so that it is ready to engage the carriage hook on the next switch. The pushrod hook and carriage hook contact surfaces are ramped so that as the carriage moves away from the lenses the carriage hook will ride over the now elevated pushrod hook. The carriage rides on its slider rod in such a way that it is free to move up. Without these features the carriage would hit the forward pushrod on its return from actuation and stall. The distance that the reflector carriage would need to push the pushrod in order to achieve this actuation is about 1 inch in an exemplary implementation. It could be shorter if enough power from the motor that moves the carriage is available. This alternate implementation requires the travel of the carriage system to be lengthened by the actuation distance as the distance used for actuation can not also be used for scanning.

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. A method for changing imaging resolution in an optical scanning system having a fixed optical sensor, and a moving carriage, comprising:

without moving the fixed optical sensor, moving the carriage to a position outside a normal scanning area;

engaging a slider linkage coupled to a slider structure which is movable between a plurality of home positions, the slider structure having mounted thereon a plurality of lenses of different optical power, wherein each said home position positions a corresponding one of said lenses in an optical scanning path for the system;

moving the slider structure to a home position by a driving force provided by motion of the carriage and the slider linkage; and disengaging the carriage from the slider linkage.

2. The method of claim 1 wherein said plurality of lenses consists of a first lens and a second lens, and said plurality of home positions consists of a first home position for the first lens and a second home position for the second lens.

3. The method of claim 1 wherein:

said moving said carriage to a position outside the normal scanning area includes moving the carriage in a first direction;

said engaging said linkage includes moving the carriage in a second direction opposite the first direction to engage the linkage;

said moving the slider structure to a home position includes moving the carriage in said second direction to exert a pulling force on said slider structure through said linkage.

4. The method of claim 1 wherein:

said moving said carriage to a position outside the normal scanning area includes moving the carriage in a first direction;

said engaging said linkage includes engaging the linkage while continuing to move the carriage in the first direction;

said moving the slider structure to a home position includes moving the carriage in the first direction to exert a pushing force on said slider structure through said linkage;

said disengaging the carriage from the slider linkage includes moving the carriage in a second direction opposite the first direction.

5. The method of claim 1, wherein a first one of said lens has an optical power to image a full width of a target to be scanned on a full extent of the optical sensor, and a second one of said lens has an optical power to image a partial width of said target on the full extent of the optical sensor.

6. An optical scanning system, comprising a fixed optical sensor array, a moving actuating carriage, an optical path between a target to be scanned and the sensor array, a lens slider structure, a plurality of lenses of different optical power mounted on the slider structure, and a linkage structure actuated by the carriage for moving the slider structure to different home positions to provide different scanner resolutions.

7. The scanning system of claim 6, further including an imaging area for imaging a target to be optically scanned, and wherein the linkage structure is actuated by a motion of the carriage outside said imaging area.

8. The scanning system of claim 6 further comprising a movable scan carriage mounting an elongated light source for producing an illumination light beam for illuminating a first extent of a target to be scanned, and wherein the optical sensor comprises a linear array of light sensitive elements, said actuating carriage carries a reflector mirror for relaying light reflected from the target to said optical sensor through one of said lens.

9. The scanning system of claim 8 further comprising a motorized drive system for driving the actuating carriage and the scan carriage.

10. The scanning system of claim 6, wherein said actuating carriage is mounted for scanning movement along a scan direction, and wherein said slider structure is mounted for sliding movement along a slide axis transverse to scan direction.

11. The scanning system of claim 6, wherein a first one of said lens has an optical power to image a full width of a target to be scanned on a full extent of the optical sensor, and a second one of said lens has an optical power to image a partial width of said target on the full extent of the optical sensor.

12. A method for changing imaging resolution for an optical sensor, comprising:

without moving the optical sensor, moving a reflector carriage toward a lens slider structure and into engagement with an individual one of a plurality of slider linkages;

guiding said individual one of said plurality of slider linkages to an individual one of a plurality of home positions for a plurality of lenses, wherein each home position optically aligns an individual one of a plurality of lenses with the optical sensor to provide a predetermined image resolution;

moving said reflector carriage toward said lens slider structure and into engagement with another individual one of said plurality of slider linkages; and guiding said another individual one of said plurality of slider linkages to another individual home position to align another individual one of the lenses with said optical sensor to provide another predetermined image resolution.

13. A system for changing imaging resolution, comprising:

a fixed optical sensor;

a carriage mounted for movement along a scan axis;

a lens slider structure mounted for movement relative to the optical sensor;

a plurality of lenses mounted on the lens slider structure, the lens slider structure having a plurality of home positions wherein each home position optically aligns an individual one of the plurality of lenses with respect to the optical sensor;

a plurality of slider linkages coupled to the lens slider structure;

a plurality of linkage engaging structures mounted on the carriage for selectively engaging respective ones of the plurality of slider linkages to drive said lens slider structure to an individual one of a plurality of home positions by movement of the carriage.

14. The system of claim 13, wherein said lens slider structure is arranged for movement between a first home position and a second home position, and wherein said plurality of slider linkages are alternatively engageable by the linkage engaging structures to toggle the lens slider structure from one of said first and second home positions to the other of said first and second home positions.

15. The system of claim 13 wherein the optical sensor is fixed in position relative to said carriage.

16. An optical scanning system, comprising a fixed optical sensor array, a moving actuating carriage mounted for scanning movement along a scan direction, an optical path between a target to be scanned and the sensor array, a lens slider structure mounted for sliding movement along a slide axis transverse to the scan direction, a plurality of lenses of different optical power mounted on the slider structure, and a linkage structure actuated by the carriage for moving the slider structure to different home positions to provide different scanner resolutions, and wherein the actuating carriage has a lateral extent along a direction transverse to the scan direction and between a first carriage end and a second carriage end, said actuating carriage further including a first hook structure disposed adjacent said first carriage end and a second hook structure disposed adjacent said second carriage end, said linkage structure including a first link rod having a first end pivotally attached to the slider structure and a distal end having a first hook structure, the distal end constrained for movement along a guided path adjacent a path traversed by the first end of the actuating carriage, and a second link rod having a first end pivotally attached to the slider structure and a distal end having a second hook structure, said distal end constrained for movement along a path traversed by the second end of the actuating carriage, and wherein the linkage structure further includes only one of said first or second rod hook structure disposed for engagement with the corresponding first and second hook structure of the actuating carriage when the actuating carriage is moved to an engagement area.

17. The scanning system of claim 16 wherein said slider structure is movable between a first home position corresponding to an active position of a first one of said plurality of lens, and a second home position corresponding to an active position of a second one of said plurality of lens.

18. The scanning system of claim 17, wherein said linkage structure is adapted to pull said slider structure from one of said home positions to the other.

19. The scanning system of claim 17, wherein said linkage structure is adapted to push said slider structure from one of said home positions to the other.

\* \* \* \* \*